Jan. 28, 1941.   C. B. SEYMOUR   2,229,821
AUTOMATIC SPARK CONTROL
Filed Jan. 22, 1938   3 Sheets-Sheet 2
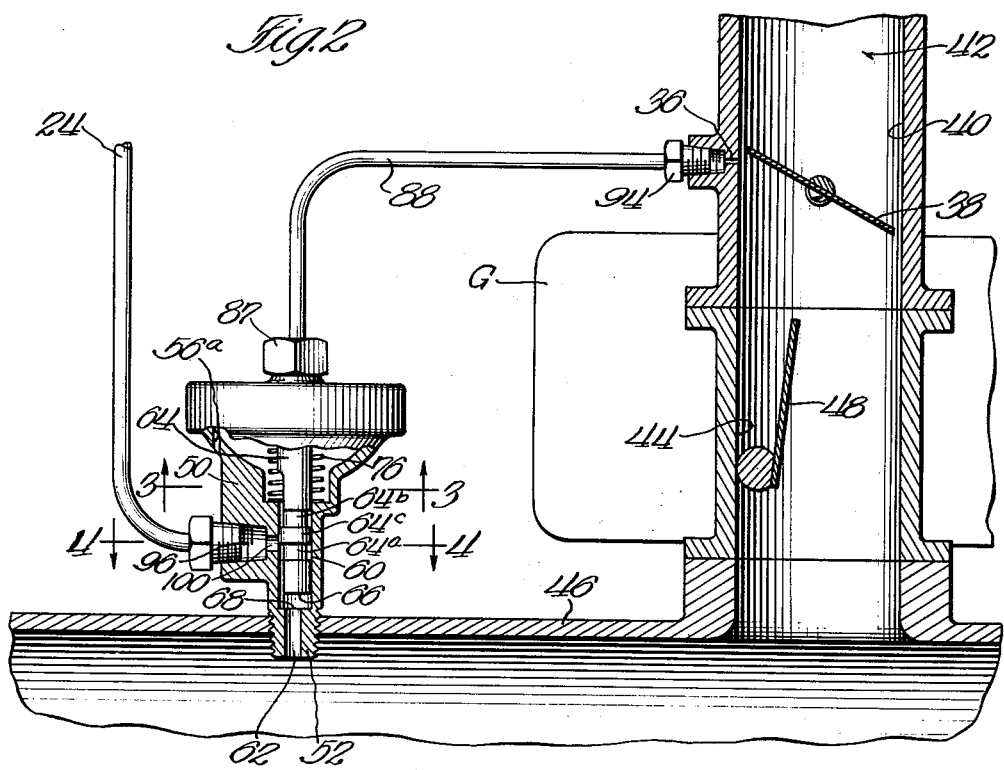
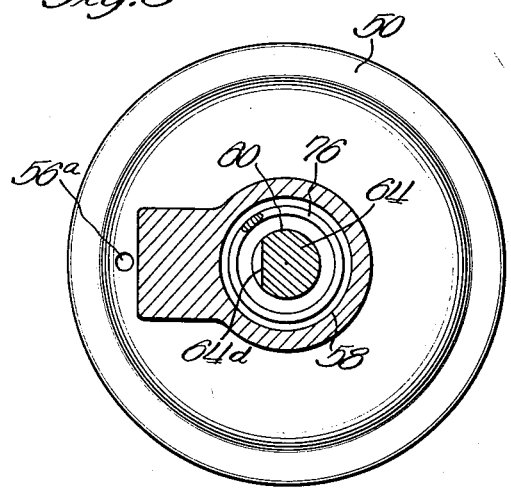
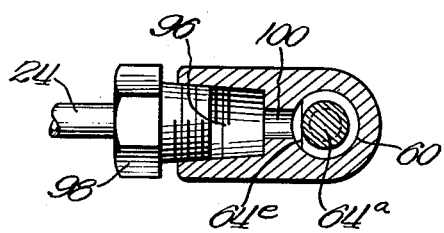
INVENTOR.
Clayton B. Seymour
BY
Harry H. Hitzeman
ATTORNEY.

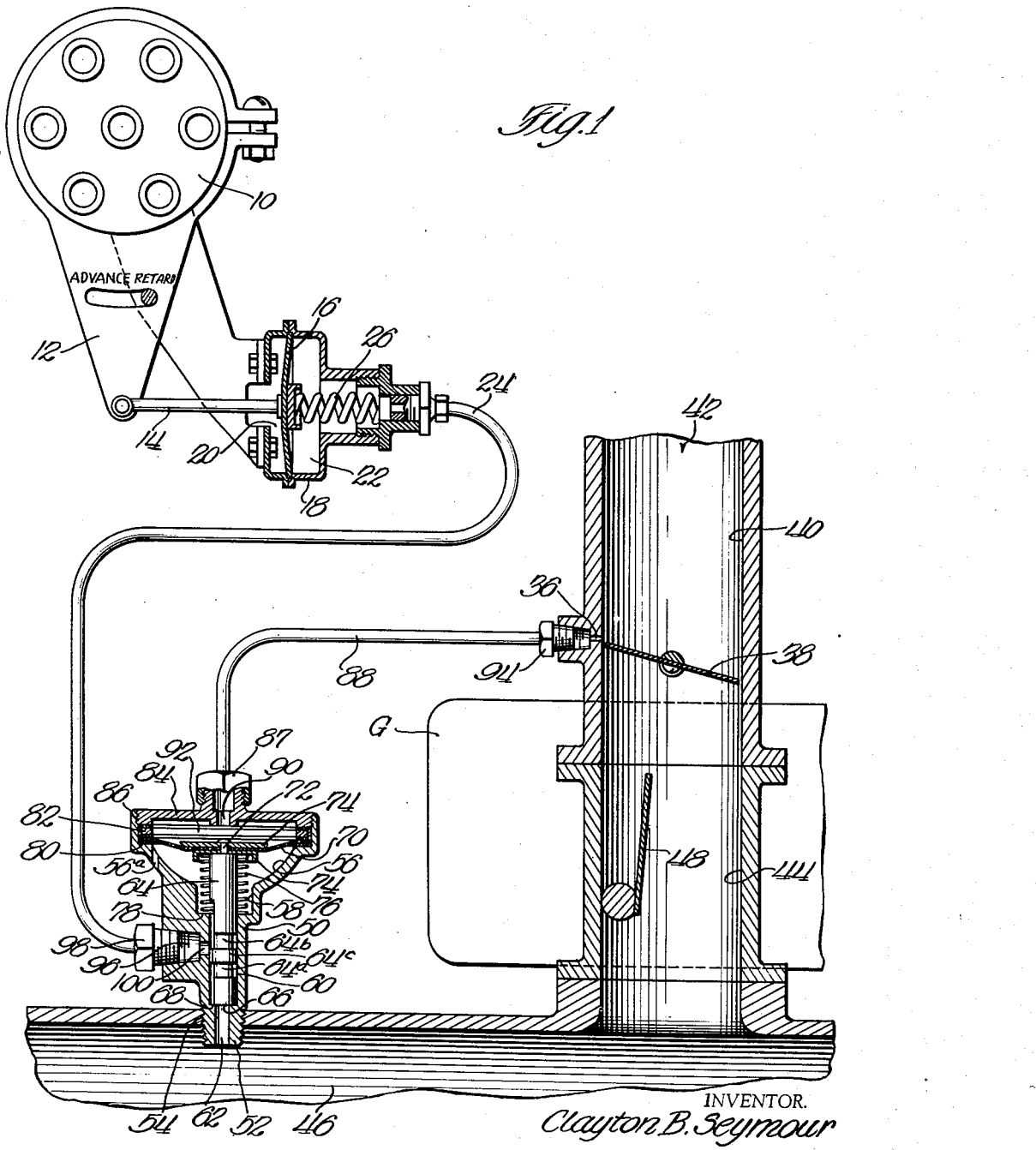

Jan. 28, 1941.  C. B. SEYMOUR  2,229,821
AUTOMATIC SPARK CONTROL
Filed Jan. 22, 1938   3 Sheets-Sheet 3
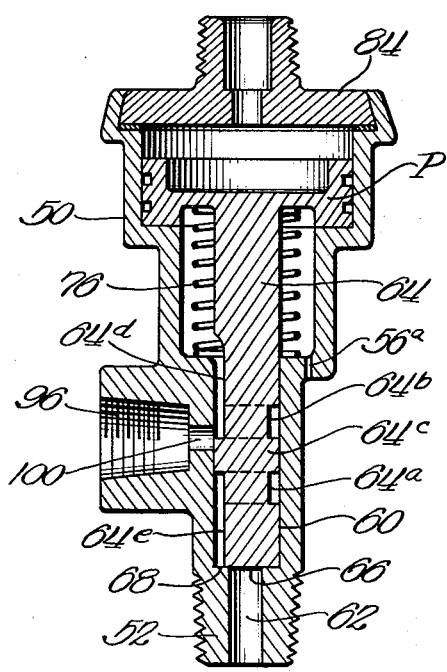
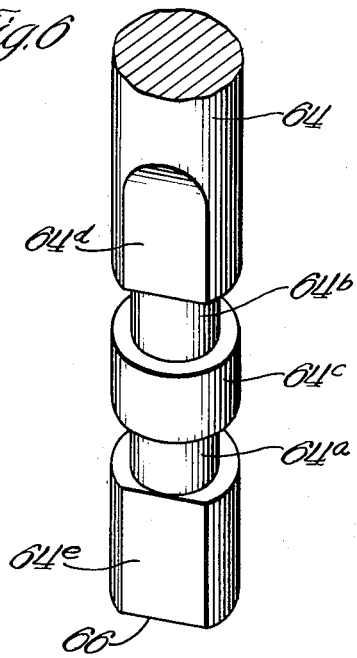
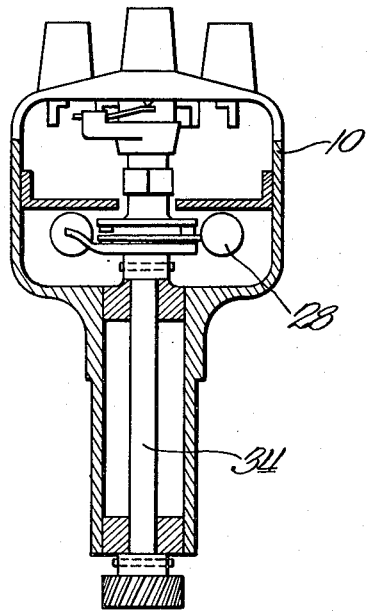
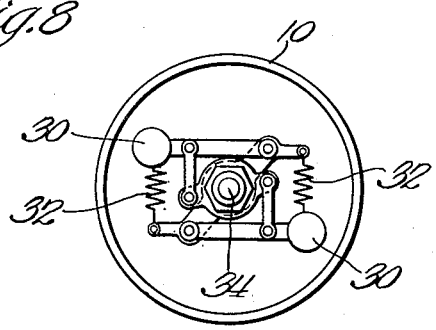
INVENTOR.
Clayton B. Seymour
BY
Harry H. Hetzman
ATTORNEY.

Patented Jan. 28, 1941

2,229,821

UNITED STATES PATENT OFFICE 2,229,821

AUTOMATIC SPARK CONTROL

Clayton B. Seymour, Chicago, Ill., assignor to Hoof Products Company, a corporation of Illinois Application January 22, 1938, Serial No. 186,447

11 Claims. (Cl. 123—117)

My invention relates to improvements in automatic spark advance mechanism for internal combustion motors.

My invention relates more particularly to improved mechanism of the type described adapted to be operated by the vacuum or sub-atmospheric pressure in the intake manifold of the motor to vary the spark in accordance with the load on the motor and thus assist the usual mechanical or centrifugally operated spark advance mechanism commonly used today. Internal combustion engines of the automotive type have for a number of years been universally equipped with an automatic device embodied in the ignition distributor to advance the spark automatically. This device was of the centrifugal type and the amount of advance depended entirely on speed, the spark advance increasing as the speed increased, and there was no provision made for varying the spark at a constant speed and a variable load. The method was quite satisfactory as long as the car was driven on a level road, but while climbing a hill, coasting or driving down a slight incline at the same speed, the constant spark advance provided by the device incorporated in the distributor did not permit the engine to run sufficiently smooth. Thus if the spark was adjusted initially for good fuel economy at "light load" it would tend to introduce knocking at "heavy load," and if the amount of spark advance was sufficiently reduced to prevent knocking at "heavy load," the fuel economy and smoothness at "light load" became unsatisfactory.

Recently a device has been developed and applied to several well-known automobiles which, in addition to the regular centrifugal spark advance incorporated in the distributor, provides means for varying the spark in accordance with the load on the engine. Such a device generally takes the form of a diaphragm or piston connected by a conduit to the intake manifold. The movement of this diaphragm is resisted by a spring and the motion thereof is transmitted to the arm of the ignition distributor, the arrangement being such that the higher the vacuum the greater the amount of the spark advance. The conduit from the diaphragm has usually been connected to the carburetor at a point adjacent the carburetor valve where with the carburetor valve closed the conduit is open to atmosphere but adapted upon movement of the valve to be transferred to the motor side thereof where it is subject to the reduced pressure in the intake manifold. Although this type of vacuum spark advance has been generally satisfactory, it was found lacking in performance under some conditions. Also, with the advent of suction controlled or vacuum operated governors and their widespread adoption by automobile owners and other users of internal combustion motors, the operation of the above-mentioned type of vacuum spark advance mechanism was prevented. This was due to the fact that with a governor valve disposed in the intake manifold on the motor side of the carburetor valve, and with a governor valve controlling the flow of fuel to the motor, the pressure conditions formerly present adjacent the carburetor valve changed and under certain conditions were transferred to a point between the intake manifold and the governor valve. Consequently, mechanism was provided for automatically transferring the location of the diaphragm conduit connection with the intake manifold from a point near the carburetor valve to a point near the governor valve, whenever the governor valve assumed control of the flow of fuel to the motor. Several different types of such mechanism are on the market today.

Certain disadvantages, however, flow from the above type of constructions. Whenever it is necessary to repair, alter or replace the carburetor, the diaphragm conduit must be disconnected and re-connected. When the governor is removed for repair, alteration or replacement, the diaphragm conduit must be disconnected and re-connected. And an essential of this mechanism is that all connections must be air tight. Therefore, extra care must be used in all this assembly and disassembly to insure proper operation of the vacuum spark advance.

With the above and foregoing objections to the present construction definitely constituted, the principal object of my invention is to provide an improved vacuum spark advance mechanism capable of direct connection to the intake manifold of an internal combustion motor.

A further object of my invention is to provide an improved pressure controlled valve member in the conduit between the diaphragm and the intake manifold.

A further object is to provide an improved valve in combination with a vacuum spark advance mechanism capable of being operated by the pressure in the intake manifold to effect or prevent communication between the diaphragm and the intake manifold.

A further object of my invention is to provide a spring-pressed valve member capable under certain conditions of closing the conduit to the intake manifold and actuated by the pressure in the same.

A further object of my invention is to provide an improved valve which includes a diaphragm inserted in a conduit associated with both the intake conduit at the carburetor valve and at the intake manifold, capable of being operated under certain conditions by the pressure in the intake conduit of the carburetor and under other conditions by the pressure vacuum in the intake manifold.

A further object is to provide an improved mechanism of the class described capable of automatic operation to be optionally under the control of the pressure in the intake manifold or at a point adjacent the carburetor valve.

Other objects and advantages of my construction will be more apparent from the following description wherein reference is had to the accompanying three sheets of drawings, upon which Fig. 1 is a generally diagrammatic view illustrating my improved unit connected to the intake manifold, to the carburetor conduit, and to the diaphragm of the automatic spark advance mechanism of the distributor;

Fig. 2 is a similar diagrammatic view of the unit and associated parts in a changed position and where the operation of the same is under the control of the condition in the carburetor conduit;

Fig. 3 is an enlarged horizontal sectional view taken on the line 3—3 of Fig. 2;

Fig. 4 is a similar sectional view taken on the line 4—4 of Fig. 2;

Fig. 5 is an enlarged cross-sectional view of a modified form of my invention;

Fig. 6 is an enlarged perspective view of a fragment of the piston valve;

Fig. 7 is a vertical sectional view through a conventional type of distributor; and Fig. 8 is a plan view with the cover removed showing the centrifugal means for advancing the spark.

In the embodiment of my invention in which I have chosen to illustrate the same, I have shown a conventional distributor 10, having an arm 12 pivotally connected to a rod 14 attached to one side of a diaphragm 16. The diaphragm 16 may be mounted in a housing 18 having its chamber 20 open to atmosphere and a chamber 22 on the opposite side of the diaphragm connected to a conduit 24. A coiled spring 26 normally holds the diaphragm in the position shown in Fig. 1, or in what is known as a retarded position. The above construction is well known in the art, and for that reason is not described in further detail.

The distributor 10 (see Figs. 7 and 8) is provided with the usual type of centrifugal spark advance 28, which usually includes the weights 30, normally held in position shown in Fig. 8 by the springs 32, but which, when the distributor drive shaft 34 revolves at a continually increasing rate of speed, fly outwardly, and in the usual manner advance the timing of the ignition.

In the usual construction of automotive engines the conduit 24 is directly connected to a port 36 located slightly above the throttle valve 38 in the conduit 40 of a down-draft carburetor 42. However, as previously explained, when a governor is employed with the usual internal combustion engine, the pressure conditions formerly present adjacent the carburetor valve change, and are transferred to a point beyond the governor valve, thus rendering ineffective the operation of the diaphragm 16. Accordingly, I have shown the usual governor G having a conduit 44 disposed between the carburetor 42 and the intake manifold 46 of the automotive engine. This governor may be of the usual type shown in the patent to Addison C. Hoof, No. 1,966,722, and may include an unbalanced valve 48 mounted in the conduit 44.

The unit which I employ to overcome the problem of having a governor positioned between the carburetor valve and the intake manifold may comprise a body portion 50 having a screw-threaded end 52 capable of being mounted in a tapped opening 54 in the wall of the intake manifold 46. The body 50 may be formed with a generally semi-cylindrical chamber portion 56 which terminates at its inner side in a reduced cylinder portion 58 and a cylindrical opening 60 leading therefrom. This opening communicates with a drilled opening 62 extending out of the end of the body and communicating with the interior of the intake manifold.

A slidable valve member 64 is adapted to be mounted in the cylindrical opening 60. The valve is formed with a flat lower end 66 adapted to sit upon a shoulder 68 at the end of the bore 60. The upper end of valve 60 is adapted to be secured to a flexible diaphragm 70, the valve being connected thereto by a pin 72 and a pair of washers 74. A compression spring 76 is positioned between the lower washer 74 and a shoulder 78 in the lower end of chamber 58. The diaphragm 70 is adapted to be held about its outer edge on a shoulder 80 formed at the outer edge of the chamber 56. It may be held in position by suitable sealing gaskets 82 and a cover member 84 screw-threadedly mounted in the open end 86 of the body 50. A conduit 88 is adapted to be connected to the cover 84 by a suitable connector member 87 and the conduit 88 may communicate through a bore 90 with the interior of chamber 92 upon one side of the diaphragm 70. The opposite end of conduit 88 may be connected by a suitable connector means 94 with a tapped opening in the carburetor conduit 40 in communication with the port 36.

The conduit 24 may extend downwardly and fasten to the body 50 in a tapped opening 96 by suitable connector means 98. A port 100 may provide a means of communication between the conduit 24 and the cylindrical bore 60. The valve 64 may be formed with a pair of reduced portions 64a and 64b upon opposite sides of a normal sized portion 64c. The valve 64 may have flattened sides 64d and 64e upon opposite sides of the reduced portions 64a and 64b thereof.

The operation of the unit is as follows. When the throttle valve 38 in the carburetor is in closed position, the port 36 is exposed to substantially atmospheric pressure. In this position the vacuum in the manifold operates upon the piston or valve 64 through the opening 62 and draws the same down to the position shown in Fig. 1. This action takes place against the normal pressure of the compression spring 76. In this position a communication is made between the conduit 24 through the port 100, along the flattened side of the valve 64, to the chamber 56. By means of the vent hole 56a, the communication is thus made to atmosphere and the spark will be in the retard position. When the carburetor valve 38 is open, a very slight amount, or sufficient to bring the opening 36 under the influence of the manifold vacuum created at this point, it immediately places a suction on the diaphragm through the conduit 88 and opening 90 into chamber 92. By reason of the fact that the area of the diaphragm which is effected by this suction is so much greater than the area of the piston at the opening 62, the valve immediately moves to its uppermost position. When this is done the conduit 24 is directly connected through port 100 and along the flattened side of valve 64 to the vacuum in the intake manifold 46. This condition is illustrated in Fig. 2.

In this position of the valve 64 the diaphragm 16 of the automatic spark advance is of course under the influence of the vacuum in the intake manifold, with the result that the spark will be immediately advanced. When, however, the carburetor valve 38 is again moved to the closed position shown in Fig. 1, there will be no vacuum through conduit 88 to the upper side of diaphragm 70, with the result that the vacuum in the manifold through port 62 will draw the piston down to the closed position shown in Fig. 2, and conduit 24 will again be connected to atmosphere, as heretofore described. The reason for the successful operation of this device as above described, resides in the fact that there is such a large difference in the area of the diaphragm 70 and the piston valve 64, and less vacuum in conduit 88 than in port 62 will nevertheless move valve 64 upwardly (Fig. 1) because the surface area of diaphragm 70 is greater than the flat lower end 66 of the valve 64. This is true because the vacuum acting upon the diaphragm 70 is capable of moving the same upwardly with less effort than is required to act upon the end of the piston rod 64 through the opening 62 to move the valve downwardly by the vacuum in the intake manifold. In addition, the intake manifold vacuum must overcome the spring 76 to move the valve to the position shown in Fig. 1, and when the device is under the influence of pressure or partial vacuum through the port 36 at the manual throttle valve, the spring naturally assists the operation of moving the valve to the position shown in Fig. 2.

With the construction thus described, it will be obvious that the difficulty encountered with other types of controls when an automobile is being driven, on a level road with a carburetor valve in a wide open throttle position and the governor controlling the speed, is eliminated. The vacuum under such conditions and under idling speed is so nearly alike that the devices not constructed in conformity with this design retard the spark instead of advancing the same. The reason this device is not affected under those conditions is because of the difference in the area effected by the vacuum through the port 36 and the port 62.

In Fig. 5 I have shown a modified form of unit in which I form a piston P integrally connected to the valve 64 and capable of operation in a reciprocatory manner, similar to the operation of the diaphragm 70. Under certain conditions it has been found advisable to form the valve and piston as an integral unit instead of providing a diaphragm and piston. All of the other parts may be generally similar, and of course the device operates in generally the same manner. Like numbers have been placed upon like parts in the modified form shown.

While I have illustrated and described a specific embodiment of my invention, it will be apparent to those skilled in the art that changes and modifications may be made in the exact details shown, and I do not wish to limit myself in any particular; rather what I desire to secure and protect by Letters Patent of the United States is:

1. In a control device for an internal combustion engine, having an intake manifold, a manual carburetor throttle therein, an automatic governor throttle in the manifold on the engine side of the manual throttle and, an ignition device for said engine, vacuum operated means for adjusting said ignition device to advance the time of sparking, a vacuum takeoff adjacent said manual throttle and a vacuum takeoff in said manifold, and means to connect the vacuum takeoff in said manifold to said vacuum operated means or connect said vacuum operated means to atmosphere, said means including a spring pressed diaphragm subject to vacuum from the take-off adjacent the manual throttle and a piston of greatly reduced diameter subject to vacuum from the manifold takeoff whereby less vacuum at said manual throttle will operate said last named means than the said manifold take-off.

2. In an internal combustion engine, in combination an intake manifold, a manual carburetor throttle therein, an automatic governor throttle in the manifold on the engine side of the manual throttle, an ignition device for said engine, vacuum operated means for adjusting said ignition device to advance the time of sparking, a vacuum takeoff adjacent said carburetor throttle and a vacuum takeoff in said manifold, and means to connect the vacuum takeoff in said manifold to said vacuum operated means or connect said vacuum operated means to atmosphere, said means including a housing, a chamber therein, a diaphragm in said chamber across the same, a piston of reduced area axially aligned and rigidly fastened on one side to said diaphragm, the opposite side connected to the vacuum takeoff at the carburetor throttle and the end of said piston connected to the vacuum takeoff at the manifold.

3. In a control device for an internal combustion engine, having an intake manifold, a manual throttle therein, an automatic governor throttle in the manifold on the engine side of the manual throttle and, an ignition device for said engine, vacuum operated means for adjusting said ignition device to advance the time of sparking, a vacuum takeoff adjacent said manual throttle, a vacuum takeoff in said manifold and means to connect said manifold vacuum takeoff to said vacuum operated means under certain pressure conditions in said manifold, and means operated by said vacuum takeoff adjacent said manual throttle to connect said vacuum operated means to atmosphere, said means including a housing, a chamber therein, a diaphragm in said chamber across the same, a piston of reduced area axially aligned and rigidly fastened on one side to said diaphragm, the opposite side connected to the vacuum takeoff at the manual throttle and the end of said piston connected to the vacuum take-off at the manifold.

4. In a spark control device for an engine provided with a manifold, an intake passage having a carburetor throttle valve and a governor valve therein, vacuum operated spark control means, and a vacuum take-off adjacent the throttle valve, a control valve responsive to the pressures in said take-off and in said manifold, said control valve being effective in one position to subject said spark control means to the manifold vacuum, and in another adjusted position to subject said spark control means to atmosphere.

5. In a spark control device for an engine provided with a manifold, an intake passage having a carburetor throttle valve and a governor valve therein, vacuum operated spark control means, and a vacuum take-off adjacent the throttle valve, a control valve responsive oppositely to the pressures in said take-off and in said manifold, said control valve being effective in one position to subject said spark control means to the manifold vacuum, and in another adjusted position to subject said spark control means to atmosphere.

6. In a spark control device for an engine provided with a manifold, an intake passage having a carburetor throttle valve and a governor valve therein, vacuum operated spark control means, and a vacuum take-off adjacent the throttle valve, a control valve responsive oppositely to the pressures in said take-off and in said manifold, said control valve being effective when under control of the manifold vacuum to connect said spark control means to atmospheric pressure and when under control of vacuum in the take-off to connect said spark control means to said manifold vacuum.

7. In a spark control device for an engine provided with a manifold, an intake passage having a carburetor throttle valve and a governor valve therein, vacuum operated spark control means, and a vacuum take-off adjacent the throttle valve, a control valve responsive oppositely to the pressures in said take-off and in said manifold, said control valve being effective when under control of the manifold vacuum to connect said spark control means to atmospheric pressure and when under control of vacuum in the take-off to connect said spark control means to said manifold vacuum, said valve means comprising opposed pressure responsive portions respectively subjected to the vacuum in said manifold and said take-off, one of said portions having a substantially relatively increased area.

8. In a spark control device for an engine provided with a manifold, an intake passage having a carburetor throttle valve and a governor valve therein, vacuum operated spark control means, and a vacuum take-off adjacent the throttle valve, a control valve responsive oppositely to the pressures in said take-off and in said manifold, said control valve being effective when under control of the manifold vacuum to connect said spark control means to atmospheric pressure and when under control of vacuum in the take-off to connect said spark control means to said manifold vacuum, said valve means comprising opposed pressure responsive portions respectively subjected to the vacuum in said manifold and said take-off, one of said portions having a substantially relatively increased area, said pressure responsive portion of substantially increased area being operatively connected to said take-off whereby to permit control of the valve by a relatively low vacuum at said take-off.

9. In a spark control device for an engine provided with a manifold, an intake passage having a carburetor throttle valve and a governor valve therein, vacuum operated spark control means, and a vacuum take-off adjacent the throttle valve, a control valve responsive to the pressures in said take-off and in said manifold, said control valve being effective in one position to subject said spark control means to the manifold vacuum, and in another adjusted position to subject said spark control means to atmosphere, said valve means comprising a pressure responsive portion of relatively great area in communication with the take-off and an opposed pressure responsive portion of relatively small area in communication with the manifold pressure.

10. For use in an internal combustion engine provided with an intake passage and having a carburetor throttle valve and a governor valve therein, the combination of a spark control device having a diaphragm having atmospheric pressure acting normally on one of its sides and being adapted on its other side to be subjected to vacuum control, a valve having a movable member oppositely subjected to manifold pressure and to pressure adjacent said throttle valve, the portion of said movable member in communication with said manifold having a substantially decreased effective area with respect to the portion of the valve in communication with said point adjacent the throttle valve.

11. A control valve for use in controlling a spark control device for an engine having an intake passage with a carburetor throttle valve and a governor valve, said control valve comprising an axially movable member cooperating with spaced, axially disposed chambers adapted to be placed in communication respectively with said intake manifold and a point adjacent said throttle valve, said axially movable member having a pressure responsive portion located in each of said chambers, said pressure responsive portion in the chamber adapted to communicate with the intake manifold being relatively small and said pressure responsive portion in the other chamber having a relatively large area, whereby said member is responsive to relatively low vacuum in said last-named chamber.

CLAYTON B. SEYMOUR.